US006621896B1

(12) United States Patent
Rinn

(10) Patent No.: US 6,621,896 B1
(45) Date of Patent: Sep. 16, 2003

(54) SELF-SCREENING TELEPHONE

(76) Inventor: Jurgen Rinn, Am Weidacker 42, D-35435 Launsbach (DE)

( * ) Notice: Subject to any disclaimer, the term of this patent is extended or adjusted under 35 U.S.C. 154(b) by 330 days.

(21) Appl. No.: 09/636,763

(22) Filed: Aug. 14, 2000

(30) Foreign Application Priority Data

Aug. 14, 1999 (DE) .......................................... 199 38 627

(51) Int. Cl.[7] .............................................. H04M 1/66
(52) U.S. Cl. ........................... 379/209.01; 379/210.01; 379/210.02; 379/214.01
(58) Field of Search ....................... 379/201.09, 210.01, 379/204.01, 190, 210.02, 211.02, 212.01, 214.01, 215.01, 88.18, 207.09, 207.1, 201.02

(56) References Cited

U.S. PATENT DOCUMENTS

| 4,926,470 A | * | 5/1990 | Sanford ....................... 379/199 |
| 5,442,814 A | | 8/1995 | Seo ............................... 455/89 |
| 5,495,235 A | * | 2/1996 | Durinovic-Johri et al. ....... 340/825.31 |
| 5,668,876 A | * | 9/1997 | Falk et al. ..................... 380/25 |
| 5,699,514 A | * | 12/1997 | Durinovic-Johri et al. ....... 395/188.01 |
| 6,128,375 A | * | 10/2000 | Punzalan et al. ............ 379/211 |

FOREIGN PATENT DOCUMENTS

| DE | 3010745 | 9/1981 |
| DE | 19535612 | 3/1996 |

* cited by examiner

Primary Examiner—William J Deane
(74) Attorney, Agent, or Firm—Liniak, Berenato & White

(57) ABSTRACT

A telephone having a self-screening mode. The self-screening mode made be switched on and off via an enabling circuit. When activated, the self-screening mode informs the caller that the call is inconvenient. However, the caller is allowed the opportunity to choose between a request for a call back, instigate a call some time later, or in urgent cases allowed to be put through to the receiver. The caller chooses the mode by hanging up in one of two distinct time modes or by simply waiting through a third time mode to be put through to the receiver in urgent cases. The caller may be notified of the time-windows by signal sounds and the length of time of each time window may be adjusted by time loops. Messages to support the caller may also be provided during the time-windows. Alternately, the caller may be prompted with a message to depress different keys to choose the different options.

20 Claims, 2 Drawing Sheets

SELF-SCREENING TELEPHONE

This application claims the benefit of German application 19938627.7-31 filed on Aug. 14, 1999 which in hereby incorporated by reference.

BACKGROUND OF THE INVENTION

1. Field of the Invention

This invention concerns means in a telephone, preferably in a cell-phone, which being switched on has the purpose to avoid disturbing the receiver; however, in urgent cases the receiver can be reached by any caller.

2. Discussion of the Related Art

It is common in business communication via stationary telephones, that arriving calls will be received by a central phone or a secretary, who decides, if the call can be put through to the requested receiver or if the call would be inconvenient at this moment. In the latter case the secretary will ask, if the caller would like to call again some time later or if he would refer to be called back, and make a note of this call.

If this kind of filter is not available, as it is the case with cell phones generally, quite often calls will disturb the receiver unnecessarily, as the caller has no information, that momentarily his call is inconvenient.

To avoid disturbances there are means at the use of a cell phone:

1. The cell phone will be shut off. The disadvantage is, that even in urgent cases the receiver cannot be reached.
2. The cell phone is set on a mode, which does not accept the call, but the phone number of the caller will be stored for a later call back by the receiver. As in case 1 one cannot be reached in urgent cases without delay.
3. The cell phone is set on a mode to transmit only calls originating from preselected phone numbers. These calls may be urgent or not. All other calls will be suppressed, even if urgent.

The patent application DE 196 48 991 A I (which is hereby incorporated by reference) describes a circuit for a cell phone, by which, when activated, an arriving call will be answered automatically by a stored message (e.g. the call is inconvenient at the moment, therefore the caller is asked to call again some time later, or the caller may wait a moment and not hang up). In the latter case the connection will be maintained for a certain time, within which the receiver can take the call.

SUMMARY OF THE INVENTION

The means according to this invention surpasses the a.m. patent application DE 196 48 991 A L For it includes the caller in a semiautomatic dialogue and offers him some alternative choices without disturbing the receiver, similar to a dialogue with a secretary as described above. Moreover the use of this invention in stationary telephones makes sense too.

The task of this invention is to provide means in a telephone, preferably in a cell phone, which—without the filter of a secretary and without disturbing the receiver— informs the receiver in a semiautomatic dialogue, that his call at the moment is inconvenient and offers him some choices for a later communication or in an urgent case puts him through in spite of the inconvenience.

This task of the invention is solved by a special and additional mode S (Secretary) according to the patent claim.

The function S consists of the combination of known circuits and programs, as they are state of the art in fax-machines, automatic answering machines and comfort telephones. The program according to this invention offers different time windows to the caller. After having been informed about the inconvenient moment of his call the caller can decide by using one of these time windows, to shut his call off, in order to call again some time later or to be called back, or to be put through because of an urgent case, which vindicates disturbing the receiver.

The multitude of various functions, the miniaturization of the cell phones and the striving for less energy consumption—all features fulfilled in modem cell phones— demand complex high-integrated microprocessor circuits. The different functions result from the programs stored in the circuit and started by defined events.

DETAILED DESCRIPTION OF THE PREFERRED EMBODIMENTS

Figure 1:
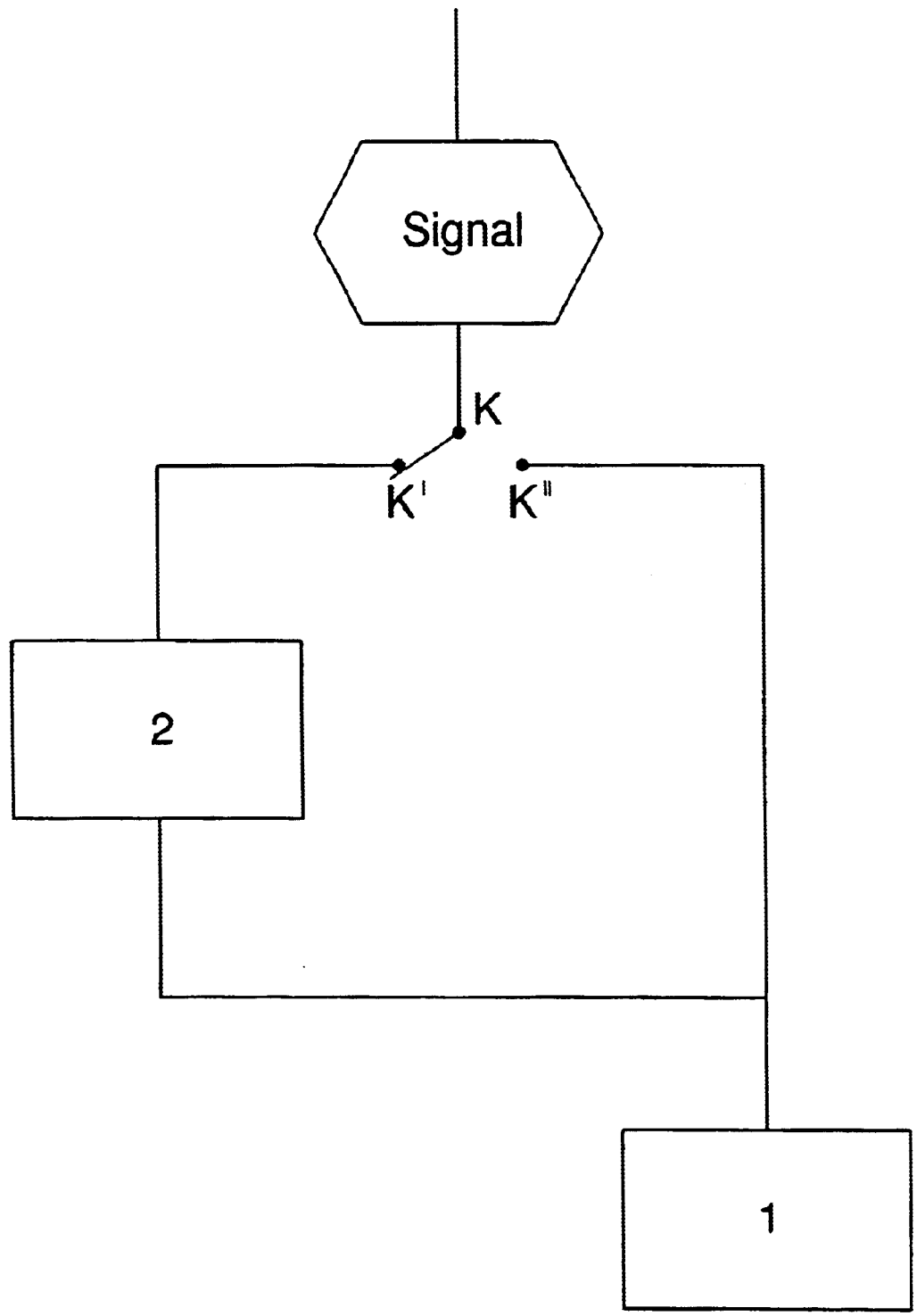
FIG. 1 is a schematic view of circuit and switching device to activate the self-screening algorithm of the present invention.
Figure 2:
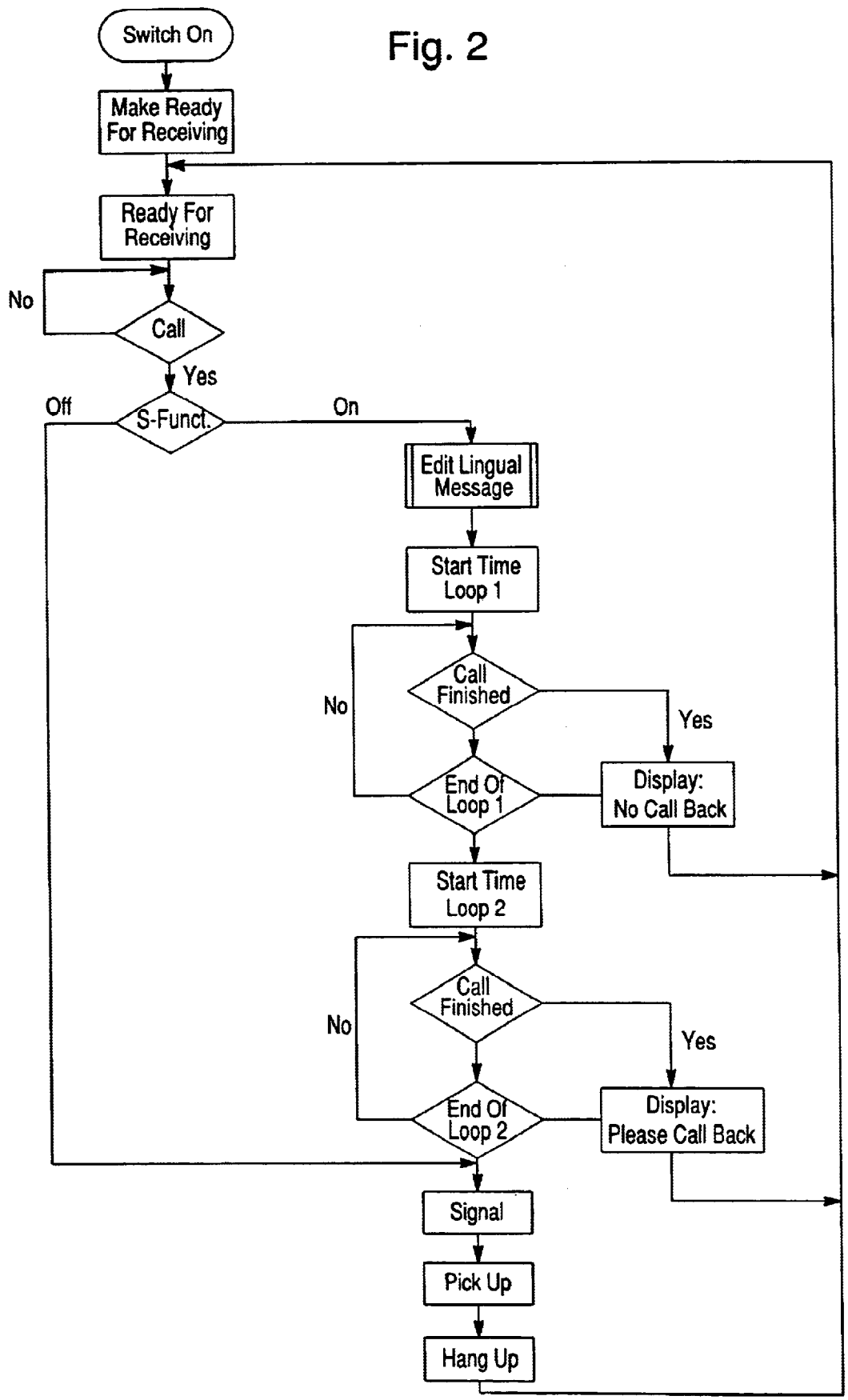
FIG. 2 depicts a flow chart illustrating the logic sequence for the self screening telphone according to the present invention.

Sketch I shows an exemplary circuit. At the entry there is a switch (K), which can be positioned alternatively in position K' or K". In position K" the telephone is used in the normal manner, i.e. if ready to receive calls an incoming call causes a notable signal and by "picking up" the receiver the phones of the caller and the receiver will be connected.

In position K' the electrical impulse of the caller-phone will be first deviated in the circuit according to the invention (2) and effects the connection of both phones without emitting a notable signal (analogous to the connection with a fax-machine) and thereafter starts the program according to this invention, as shown in sketch 2.

If the caller does not shut off his call before, the electrical impulses will be transmitted in the main section (1) (analogous to the connecting by a secretary) and cause notable signals for the receiver, until he picks it up or the caller shuts it off.

In sketch 2 an example of the program is shown for a cell phone: The cell phone is switched on and ready to receive calls. If switch (K) in sketch I is in position K", an incoming call causes a notable signal. The phones get connected by picking up and disconnected by shutting off at one side. If switch (K) in sketch I is in position K' to perform the function S, first both phones will be connected without a notable signal and second a message will be transmitted to the caller, e.g.

This is the phone of NN. At the moment your call is very inconvenient. But if it is urgent, do not hang up and wait to be put through after the third sound. If it is not urgent and you would like to call again, please hang up after the first sound. If we can call you back, please hang up after the second sound.

This message for the caller will be finished with the first sound, from which on a time-loop of e.g. 2 seconds starts. If the caller hangs up during this loop, his phone number will be stored in the cell phone and a remark "no call back" shown in the display after request.

If the two phones are still connected after the first loop, a second sound for the caller will be emitted, from which on a second time-loop of e.g. 2 seconds will be started. If the caller hangs up during this loop, his phone number will be stored in the cell phone and a remark "please call back" shown in the display after request.

If the two phones are still connected after the second loop, a third sound for the caller will be emitted and thereafter a notable signal for the receiver, until the receiver picks the telephone up or the caller hangs up.

In a changed mode of the program there are messages in the time loops:

In the first time loop e.g.

If you want to call later on again, please hang up now.
In the second time loop e.g.

If we can call you back, please hang up now.
And after the third sound

Please wait, you get now connected.

Alternately, rather than time-windows, the caller may be prompted by a message to depress on of several different keys to choose the different option. For example, the caller may depress the key "1" to indicate the caller will call again later, "2" key to request a call back, and "3" key to indicate it is an urgent call and therefore the call will go through.

I claim:

1. A telephone comprising call automatic signaling means actuable on receipt of an incoming call from a caller to provide a signal indicative of the presence of said incoming call and call intercept means responsive to receipt of a call to inhibit actuation of the signaling means and to notify the caller of conditions for connection of the call and of options exercisable in a time sequence, said options automatically activated after an expiration of a predetermined period of time, said options including:

1) terminating the call, 2) for leaving a message on message recording means 3) activating a return call instruction, and 4) for connecting the call, wherein, the intercept means being arranged to cancel inhibition of the actuation of the signaling means in response to caller selection the option for connecting the call.

2. A telephone as claimed in claim 1, comprising switching means operable to selectably enable or prevent response of the intercept means.

3. A telephone as claimed in claim 1, the intercept means being arranged to enable the option of activating a return call instruction only after expiry of a predetermined delay time.

4. A telephone as claimed in claim 3, the intercept means being arranged to enable the option for leaving a message on message recording means only after expiry of a second predetermined delay time less than that for the option of activating a return call instruction.

5. A telephone as claimed in claim 1, the intercept means being arranged to allow exercise of the option of activating a return call instruction only during a predetermined period of time.

6. A telephone as claimed in claim 2, the intercept means being arranged to activate one of the message recording means and the return call instruction in response to termination of the call during said predetermined period of time.

7. A telephone as claimed in claim 1, comprising means for adjusting one of the delay times.

8. A telephone as claimed in claim 1, comprising means for acoustically notifying the caller of expiry of one of the delay times.

9. A telephone as claimed in claim 1, wherein the telephone is a mobile telephone.

10. A telephone as claimed in claim 2, the intercept means being arranged to enable the option of activating a return call instruction only after expiry of a predetermined delay time.

11. A telephone as claimed in claim 3, comprising means for adjusting the delay times.

12. A telephone as claimed in claim 2, comprising means for adjusting one of the delay times.

13. A telephone as claimed in claim 3, comprising means for adjusting one of the delay times.

14. A telephone as claimed in claim 3, comprising means for acoustically notifying the caller of expiry of the delay time.

15. A telephone as claimed in claim 2, comprising means for acoustically notifying the caller of expiry of the delay time or of at least one of the delay times.

16. A telephone as claimed in claim 3, comprising means for acoustically notifying the caller of expiry of the delay time or of at least one of the delay times.

17. A telephone as claimed in claim 4, comprising means for acoustically notifying the caller of expiry of the delay time or of at least one of the delay times.

18. A telephone as claimed in claim 1, wherein the telephone is a mobile telephone.

19. A telephone as claimed in claim 13, wherein the telephone is a mobile telephone.

20. A mobile telephone having a selectably activated self screening mode, said mobile telephone comprising automatic call signaling means actuable on receipt of an incoming call from a caller to provide a signal indicative of the presence of said incoming call and call intercept means responsive to receipt of a call to inhibit actuation of the signaling means in said self screening mode and to notify the caller of conditions for connection of the call and of options exercisable in a time sequence, said options automatically activated after an expiration of a predetermined period of time, said option including:

1) terminating the call;

2) activating a return call instruction; and 3) for connecting the call in urgency;

wherein, the intercept means being arranged to cancel inhibition of the actuation of the signaling means in response to caller selection the option for connecting the call.

* * * * *